(12) United States Patent
Ruprich et al.

(10) Patent No.: US 7,522,655 B2
(45) Date of Patent: Apr. 21, 2009

(54) METHOD AND DEVICE FOR CARRYING OUT A PLURALITY OF CORRELATION PROCEDURES IN A MOBILE TELEPHONY ENVIRONMENT

(75) Inventors: Thomas Ruprich, München (DE);
Steffen Paul, Baierbrunn (DE);
Burkhard Becker, Ismaning (DE);
Thuyen Le, Schönaich (DE); Manfred Zimmermann, München (DE);
Christian Drewes, Germering (DE)

(73) Assignee: Infineon Technologies AG, Munich (DE)

( * ) Notice: Subject to any disclaimer, the term of this patent is extended or adjusted under 35 U.S.C. 154(b) by 563 days.

(21) Appl. No.: 11/075,848

(22) Filed: Mar. 9, 2005

(65) Prior Publication Data
US 2005/0207479 A1   Sep. 22, 2005

Related U.S. Application Data

(63) Continuation of application No. PCT/DE03/02353, filed on Jul. 11, 2003.

(30) Foreign Application Priority Data
Sep. 9, 2002   (DE) ................................ 102 41 693

(51) Int. Cl.
*H04B 1/707* (2006.01)
(52) U.S. Cl. ....................................... 375/150; 375/343
(58) Field of Classification Search ................. 375/150, 375/343, 142, 149
See application file for complete search history.

(56) References Cited

U.S. PATENT DOCUMENTS

| 4,852,090 | A | 7/1989 | Borth |
| 6,678,313 | B1* | 1/2004 | Imaizumi et al. ............ 375/150 |
| 7,245,652 | B2 | 7/2007 | Wilson |
| 2001/0048713 | A1 | 12/2001 | Medlock et al. |
| 2003/0220755 | A1* | 11/2003 | Darbel et al. ................. 702/89 |

FOREIGN PATENT DOCUMENTS

| DE | 40 38 561 C2 | 4/1992 |
| DE | 198 32 850 A1 | 2/2000 |
| DE | 100 05 441 A1 | 6/2001 |
| DE | 199 55 757 A1 | 6/2001 |
| DE | 100 12 875 A1 | 9/2001 |
| EP | 0 343 189 B1 | 11/1989 |
| EP | 1 109 324 A2 | 6/2001 |
| WO | WO 99/67895 A1 | 12/1999 |
| WO | WO 01/56199 A1 | 8/2001 |

OTHER PUBLICATIONS

U.S. Appl. No. 11/076,094, filed Mar. 9, 2005, Ruprich et al., Entire Document.

(Continued)

*Primary Examiner*—Kevin Y Kim
(74) *Attorney, Agent, or Firm*—Eschweiler & Associates, LLC

(57) ABSTRACT

In a method for carrying out a plurality of correlation procedures in a mobile radio system, sample values which have been written to a data memory (DS) are read using a predetermined reading rule. Two correlation procedures are carried out on the basis of the sample values which have been read. This reading rule is in this case independent of the correlation procedure to be carried out.

21 Claims, 7 Drawing Sheets

OTHER PUBLICATIONS

3G TS 25.213 v. 3.3.0 (Jun. 2000) "3rd Generation Partnership Project; Technical Specification Group Radio Access Network; Spreading and Modulation (FFD)" (Release 1999), 26 pgs.
International Search Report, Int'l Application No. PCT/DE03/02814, Int'l Filing Date Aug. 22, 2003, 2 pgs.

3G TS 25.213 V4.3.0. (Jun. 2002), "3rd Generation Partnership Project; Technical Specification Group Radio Access Network; Spreading and Modulation (FDD)" (Release 4), Chapter 5.2.3, 8 pgs.
International Search Report, Int'l Application No. PCT/DE03/02353, Int'l Filing date Jul. 11, 2003, 3 pgs.

* cited by examiner

One memory element : 128 x 16 Bits ;
Input data memory : 16 x 128 x 16 Bits ⟶ 2048 half chips with a word length of 16 bits

METHOD AND DEVICE FOR CARRYING OUT A PLURALITY OF CORRELATION PROCEDURES IN A MOBILE TELEPHONY ENVIRONMENT

REFERENCE TO RELATED APPLICATIONS

This application is a continuation of PCT/DE03/02353 filed on Jul. 11, 2003, which was not published in English, which claims the benefit of the priority date of German Patent Application No. DE 102 41 693.1, filed on Sep. 9, 2002, the contents of which both are herein incorporated by reference in their entireties.

FIELD OF THE INVENTION

The invention relates to a method and a device for carrying out a plurality of correlation procedures in a mobile radio system.

BACKGROUND OF THE INVENTION

Correlation procedures are used for a wide range of tasks in a mobile radio receiver. In a correlation process, the arriving data is compared, in the form of sample values, with a sequence of data items, which are known in the receiver. If the arriving data matches the sequence of known data, a correlation signal is emitted which indicates that the sequence of known data items has been identified in the received signal.

By way of example, the time-slot synchronization in a receiver is carried out on the basis of the correlation of a pilot signal with the pilot sequence which is known in the receiver. In the UMTS Standard, the pilot signal for time-slot synchronization is transmitted via the first common pilot channel pCPICH (primary Common Pilot Channel). The pilot sequence, which is known in the receiver, has a length of 256 chips, and is transmitted at the start of each time slot.

Frame synchronization is likewise carried out by correlation of a transmitted pilot signal with a known pilot sequence. In the UMTS Standard, the pilot sequence for frame synchronization is transmitted via the second common pilot channel sCPICH (secondary Common Pilot Channel). The spreading factor for the second pilot sequence is likewise 256. A third example of the use of correlation procedures for carrying out a mobile radio task relates to the estimation of the delay time for one transmitted signal propagation path. Owing to multi-path propagation in mobile radio systems, one and the same transmitted signal is received with a time offset at the receiver, and with different attenuation levels, via different propagation paths. In the course of the equalization process, the time offset between the individual signal components must be measured and must be compensated for (delay estimation). The estimation of the delay time on the propagation path, which is also referred to as delay estimation, is carried out using a product correlation sequence comprising a scrambling code, a channelization code and pilot symbols.

The time-slot and frame synchronizations are used to search for new (mobile radio) cells in the so-called active set (group of currently used cells) and in the so-called monitor set (group of monitored cells which are candidates for the active set). Time-slot and frame synchronizations must therefore be carried out continually even when telephone connection has already been set up. An analogous procedure applies, of course, for delay estimation, which must be continually updated on the basis of changing channel conditions.

Until now, dedicated correlators in the form of matched filter circuits have been provided for each of these correlation tasks in a mobile radio receiver. These matched filter circuits are each designed for only one specific correlation task, and are not interchangeable. They each have an input memory in which the data or sample values to be correlated is or are stored. The sample values are then read from the memory and are fed to a registered chain with intermediate taps (tapped delay line). The taps on the registered chain are connected to multipliers, which multiply the tapped-off sample values by the values of the local correlation sequence. The multiplication results are added and form the correlation signal.

This has the disadvantage that the individual input memories as well as the registered chains cannot be used for two or more correlation tasks, by virtue of their design.

SUMMARY OF THE INVENTION

The present invention includes methods and devices for carrying out a plurality of correlation procedures in a mobile radio system, which allows correlation procedures to be handled flexibly and with little effort in a mobile radio environment. The methods and devices of the present invention permit a relatively high degree of hardware compatibility, while supporting a plurality of correlation procedures being carried out at the same time.

Accordingly, in the case of a method according to an aspect of the present invention for carrying out a plurality of correlation procedures, sample values are written to a common data memory. The sample values are then read from the data memory in accordance with a predetermined reading rule. A first correlation procedure is carried out using a first correlation sequence on the basis of the sample values that have been read. Furthermore, a second correlation procedure is carried out using a second correlation sequence, which is not the same as the first correlation sequence, on the basis of the sample values that have been read. In this case, the reading rule is independent of the correlation procedure to be carried out.

The universal nature of the reading rule allows the two correlation procedures to be carried out on the basis independently of one another. Since the reading rule is identical for both of the (different) correlation procedures to be carried out, this permits a single data memory to be sufficient for "supplying" the correlation procedures. The common reading rule means that the procedures can be activated and deactivated at independent times from one another, this being an essential requirement, for example, for time-slot and/or frame synchronization (first correlation procedure) and for delay estimation (second correlation procedure). In comparison to the conventional use of individual correlators for different synchronization tasks, there are therefore no restrictions with the method according to the invention.

The data memory, in one aspect, is formed from M separately addressable memory elements, wherein M is an integer greater than 1. The number M on the one hand determines the number of simultaneous memory accesses in one reading step. The higher the value of M, the more complex is the design of the data memory, since each memory element has an internal address generator and an internal reading unit. On the other hand, a high degree of "memory granularity", that is to say a high value of M—with a predetermined parallelity (N sample values per reading step) for the hardware correlators allows the control complexity in the hardware correlators to be simplified. This will be explained in more detail in the following text with reference to the description.

One embodiment variant of the method is characterized in that M=N. In this case, one and only one sample value is stored at one address in each memory element. All M memory elements of the data memory are addressed in one reading step, in order to read the N=M sample values. The advantage of this embodiment variant is that the independent drive for all the M memory elements means that a reading sequence with an offset which can be predetermined as required with respect to a previously read sequence can be produced in each reading step.

According to one alternative variant of the invention, it is possible to provide for M=N/2 or M=N/4. In this case, the data memory is less complex but, however, the minimum offset between two sequences that have been read is two sample values (where M=N/2) or four sample values (where M=N/4).

The two correlation procedures can be carried out using a first hardware correlator and a second hardware correlator, which are arranged in parallel. However, it is not essential for two hardware correlators also to be provided for carrying out two (different) correlation procedures at the same time. According to one alternative embodiment variant of the invention, both correlation procedures are thus carried out using one and the same hardware correlator, with this hardware correlator being operated using the time-division multiplexing mode at the start of the process of carrying out the second correlation procedure.

In accordance with another aspect of the invention, a circuit arrangement according to the invention for carrying out a plurality of correlation procedures has a data memory for storage of sample values from a received signal, a means for production of addresses for reading sample values from the data memory, and at least one hardware correlator, wherein this correlator on its own or together with a further hardware correlator carries out a first correlation procedure using a first correlation sequence, and a second correlation procedure using a second correlation sequence, which is not the same as the first correlation sequence, on the basis of the sample values which have been read. The first correlation procedure is associated with a first task in a mobile radio receiver, while the second correlation procedure is associated with a second task, which is not the same as the first task, in a mobile radio receiver. In this case the means for production of the addresses produces these addresses using a rule, which is independent of the correlation procedure to be carried out.

BRIEF DESCRIPTION OF THE DRAWINGS

The invention will be explained in more detail in the following text using one exemplary embodiment and with reference to the drawing, in which.

DETAILED DESCRIPTION OF THE INVENTION

Figure 1:
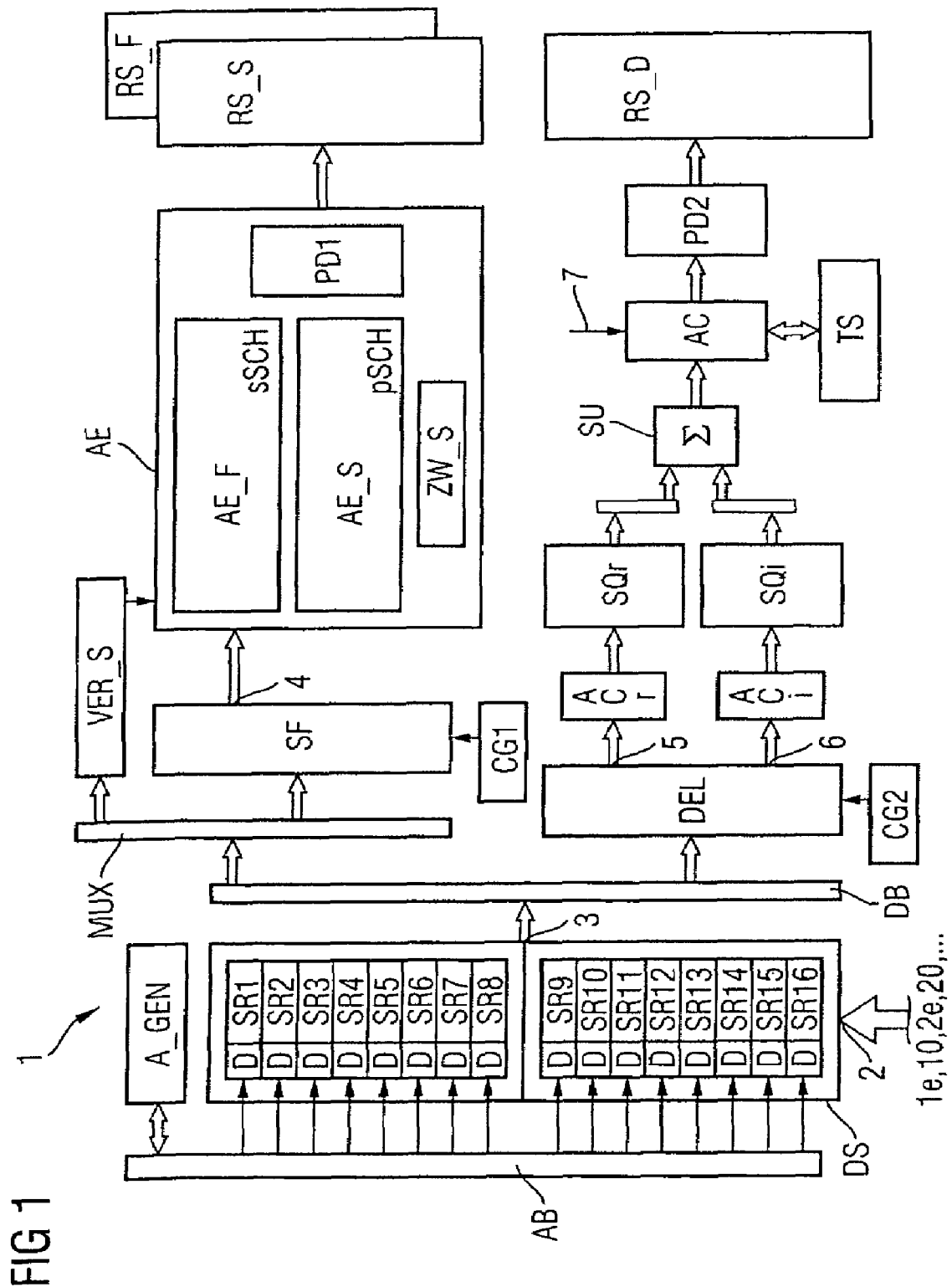
FIG. 1 shows a schematic illustration of the architecture of a circuit according to the invention.

The present invention will now be described with reference to the drawings wherein like reference numerals are used to refer to like elements throughout. The illustrations and following descriptions are exemplary in nature, and not limiting. Thus, it will be appreciated that variants of the illustrated systems and methods and other such implementations apart from those illustrated herein are deemed as falling within the scope of the present invention and the appended claims.

FIG. 1 shows the overall configuration of a synchronization circuit 1, which is intended not only for carrying out time-slot and frame synchronization but also for carrying out delay estimation in a mobile radio receiver. Synchronization circuits 1 such as these are frequently referred to as "searchers" (search circuits).

The synchronization circuit 1 has an input data memory DS which is formed from 16 individual memory elements SR1, SR2, . . . , SR16. The memory elements SR1, SR, . . . , SR16 are driven via an address generator A_GEN, which is connected via an address bus AB to address decoders D for the individual memory elements SR1, SR2, . . . , SR16. The input data memory DS is supplied via a data input 2 with complex sample values, which are annotated in FIG. 1 as 1$e$, 1$o$, 2$e$, 2$o$ . . . . The sample values are produced with double oversampling by an analog/digital converter (not illustrated). The analog/digital converter samples a receive signal, which has normally been received via an antenna and has been downmixed to an intermediate-frequency band.

In the UMTS Standard, one time slot, whose duration is 0.666 ms, contains a total of 2560 chips. When oversampled with a factor of 2, there are 5120 sample values for the in-phase component and 5120 sample values for the quadrature component in each time slot. Unless stated to the contrary, the expression of sample value in the following text means a data word which includes not only the sample value for the quadrature component but also the sample value for the in-phase component (that is to say actually two simultaneous sample values). Two such sample values 1$e$, 1$o$ and 2$e$, 2$o$, . . . which are adjacent in time are in each case also referred to as an odd-numbered half chip 1$e$ or 2$e$, . . . , respectively, and an even-numbered half chip 1$o$, 2$o$, . . . .

Figure 4:
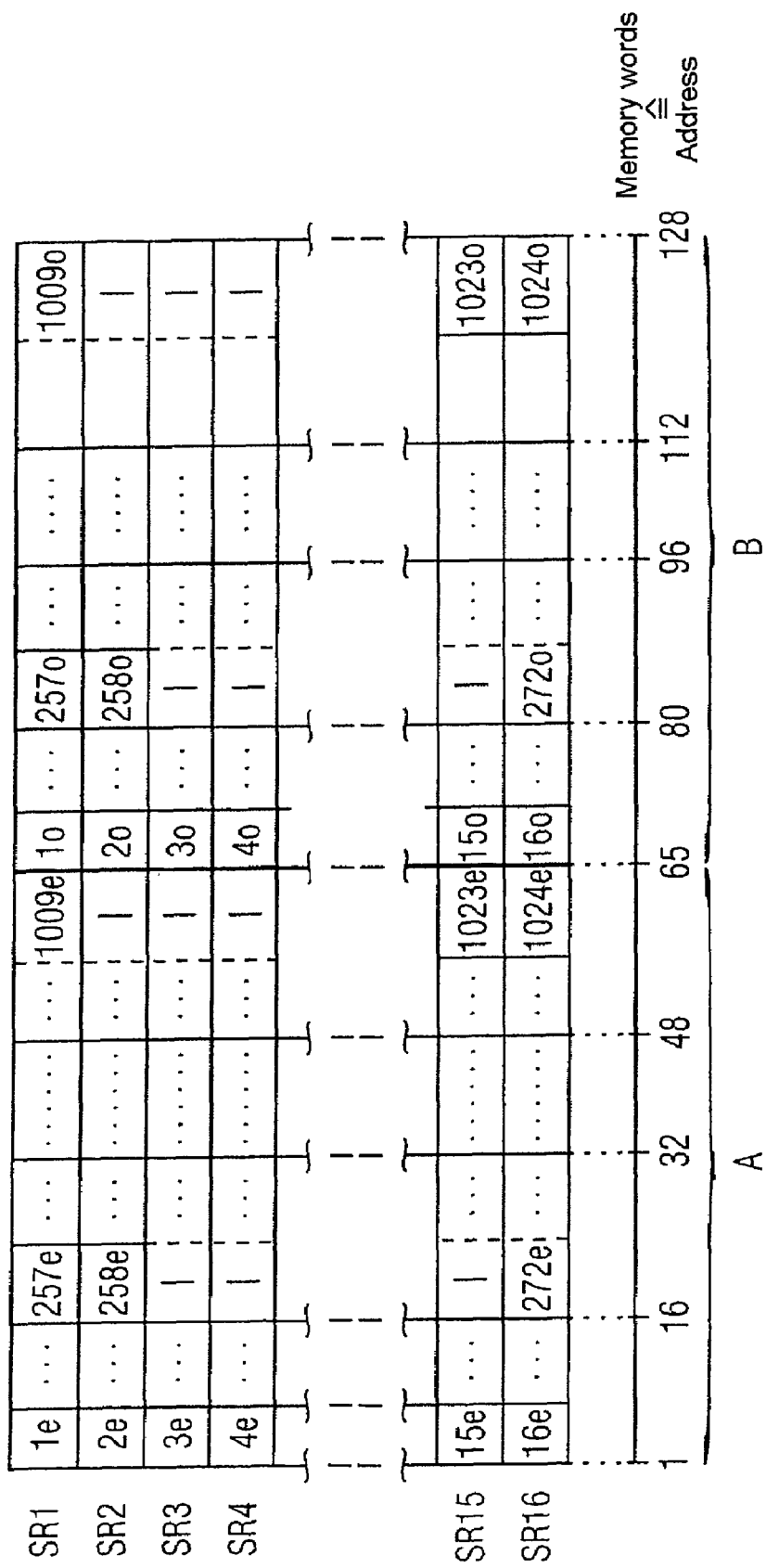
FIG. 4 shows a schematic illustration of the memory occupancy in a data memory for supplying two correlator data paths.

The sample values are written to the input data memory DS in a manner which will be explained in more detail later (see FIG. 4). The sample values (half chips) are emitted via a data bus DB to two data paths SF and DEL at a data output 3 (which preferably corresponds to the data input 2 since the input data memory DS is preferably a single-port RAM). The data path SF is responsible for time-slot and frame synchronization, while the data path DEL carries out correlation procedures for delay estimation. The sample values which have been read from the input data memory DS can optionally be supplied via a multiplexer MUX to a verification unit VER_S, which checks the time-slot synchronization and likewise operates on the basis of correlation procedures. Furthermore, other data paths may be provided which assess the sample values which have been read from the input data memory DS. The invention will be explained by way of example in the following text solely on the basis of the data paths SF for time-slot and frame synchronization, and DEL for delay estimation.

The data path SF is connected to a first code generator CG1, which provides a suitable correlation sequence for the data path SF. The data path DEL is connected to a second code generator CG2, which provides this with a correlation sequence which is suitable for delay estimation.

The data path SF emits at an output 4 correlation values which are in each case the result of one correlation processing operation on 256 sample values which have been read, over a correlation sequence comprising 256 chips. The sequence sSCH, which is transmitted using the UMTS channel sCPICH, is used as the local correlation sequence for frame synchronization, while the correlation sequence pSCH, which is transmitted using the UMTS channel pCPICH, is used for time-slot synchronization. In the following text, the expression correlation value always means the result (related to a specific fixed time between the sample values and the correlation sequence) of an element-by-element multiplication of the sample values and the correlation sequence, and subsequent summation of the multiplication results.

Correlation values are calculated by means of the data path SF for all possible time differences between the sample values and the local correlation sequence. The higher the correlation value, the higher is the probability of the associated time difference (between the sample values that have been read and the correlation sequence) being the receive synchronization time, which is sought for time-slot synchronization (correlation sequence pSCH) and for frame synchronization (correlation sequence sSCH), and of defining this.

The correlation values are supplied to an evaluation unit AE. The design of the evaluation unit AE is not of central importance to the present invention, and will therefore be explained only qualitatively. The evaluation unit AE has an evaluation unit AE_S for time-slot synchronization, and an evaluation unit AE_F for frame synchronization. Furthermore, it has an intermediate value memory ZW_S and a first peak value detector PD1.

Except for differences which are irrelevant to the present invention, the two evaluation units AE_F and AE_S operate in the same way. This will be explained in the following text for the evaluation unit AE_S:

Since the mobile radio channel is not a static channel, it is not sufficient to carry out the evaluation process described above (determination of the maximum correlation value) for only a single time slot. A plurality of time slots must typically be processed in order to make an error-free decision on the time-slot boundary. In consequence, it is necessary to accumulate correlation values or data derived from them over a plurality of time slot intervals, and to use the accumulated correlation values and derived data in order to decide the time-slot synchronization time.

The accumulated correlation values and derived data are or is stored in the intermediate-value memory ZW_S.

A first option is to accumulate the correlation values relating to the same time difference over an adequate number of time slots, and to supply the accumulated correlation values to the peak value detector PD1. The peak value detector PD1 determines that accumulated correlation value which has the highest value. The associated time difference is written to the result memory RS_S for time-slot synchronization, and defines the synchronization time. That time difference which defines the frame synchronization time is written in an analogous manner to the result memory RS_F for frame synchronization. An alternative option for data accumulation is to count for each possible time difference (between the sample values which have been read and the correlation sequence) how often the associated correlation value exceeds a specific threshold value. If, by way of example, eight time slots are evaluated, the count for each time difference is between 0 and 8. The counts are then accumulated in the buffer store ZW_S, and the peak value detector PD1 determines those time differences which have the maximum count (or above a specific further threshold value). These time differences are written to the result memory RS_S for time-slot synchronization or, respectively, to RS_F for frame synchronization, and the actual synchronization time is then determined by a further selection step.

The data path DEL is connected via an output 5 for the real part of a correlation signal to an accumulator ACr and via an output 6 for the imaginary part of the correlation signal to an accumulator ACi. The two accumulators ACr and ACi are each followed by squarers SQr for the real part and SQi for the imaginary part. The squared correlation values are supplied to an adder SU, and are added in pairs. The adder SU is followed by an accumulator AC. The number of correlation values which should be accumulated can be signaled to the accumulator AC via an input 7. The accumulated correlation values are stored in a temporary memory TS and are at the same time supplied to a second peak value detector PD2. The second peak value detector PD2 filters out of the accumulated correlation values that are obtained either that accumulated correlation value with the highest magnitude or a plurality of accumulated correlation values (for example 32 of them) which exceed a specific threshold value. The time difference of the correlation value or the time differences of the plurality of accumulated correlation values are stored in a result memory RS_D for delay estimation. If a plurality of time differences are stored for one propagation path, the final delay time must also be determined in a subsequent selection step, which is not described in any more detail here.

Figure 2:
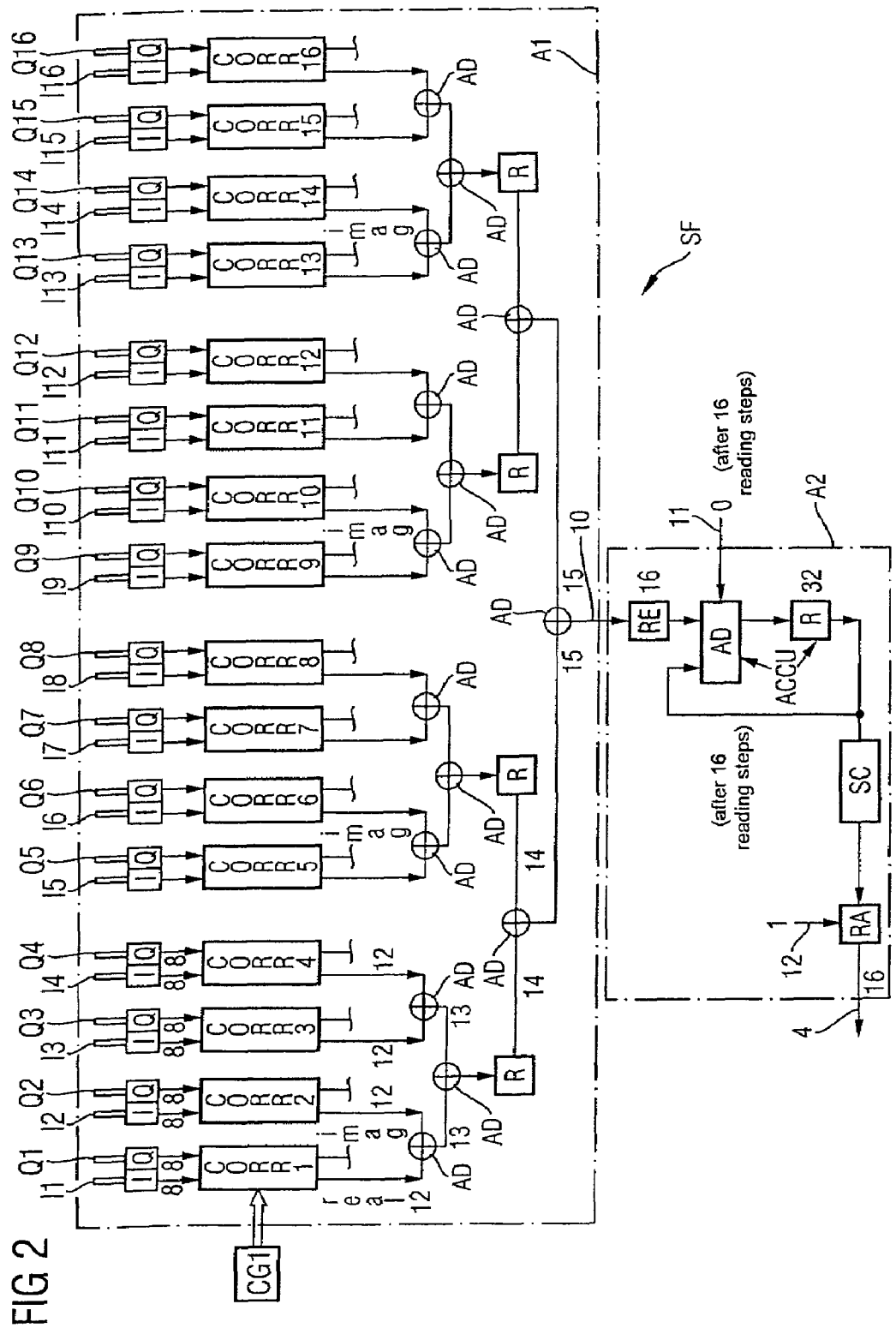
FIG. 2 shows the configuration of a correlator data path in FIG. 1.

FIG. 2 shows the configuration of the data path SF. A first section A1 of the data path SF has 16 correlator segments CORR1, CORR2, ..., CORR16 arranged in parallel with one another. Each correlator segment CORR1, CORR2, ..., CORR16 receives a sample value (16 bits) comprising the in-phase component (8 bits) and the quadrature component (8 bits) which are stored in two input registers I, Q. The inputs of the input registers I and Q for the correlator segments CORR1, CORR2, ..., CORR16 are annotated with the reference symbols I1, Q1, I2, Q2, ..., I16, Q16. The numbers quoted in FIG. 2 denote data word lengths.

Each correlator segment CORR1, CORR2, ..., CORR16 is connected to the first code generator CG1 and also has two outputs (one for the real part and one for the imaginary part). In each correlator segment CORR1, CORR2, CORR16, one sample value (half chip) is multiplied by in each case one value of the correlation sequence. The detailed configuration of the correlator segments CORR1, CORR2, ..., CORR16 will be explained later in more detail with reference to FIG. 3.

The results which are emitted at the output of each correlator segment CORR1, CORR2, ..., CORR16 are added up separately for the real part and for the imaginary part by means of a circuit comprising adders AD and registers R. The two circuits for adding up the results are identical, with FIG. 2 illustrating only the circuit for adding up the results for the real part.

A partial correlation value (for the real part) is emitted at an output 10 of the first circuit section A1, with this partial correlation value having been obtained from a correlation (element-by-element multiplication) between 16 sample values and 16 values of the correlation sequence. Since the 16 sample values are read in one reading step from the input data memory DS—this will be explained in more detail later—, this partial correlation value is produced in one machine cycle.

The circuit illustrated in the circuit section A2 accumulates the partial correlation values in order to produce correlation values. For this purpose, the circuit section A2 has an input register RE, an accumulator ACCU comprising an adder AD and a register R, as well as an optional scaling stage SC, which is followed by an output register RA. The adder AD can be set to the value 0 via a reset input 11. The output register RA emits the stored value as soon as the value 1 is applied via a control input 12.

The accumulator ACCU is driven via the reset input 11 such that 16 partial correlation values are in each case accumulated. This means that the adder AD is set to the value 0 via the reset input 11 after 16 reading steps for the input data memory DS. The values emitted from the accumulator ACCU are scaled, and are written to the output register RA. The output register RA is driven via the control input 12 such that the value stored in the 16th reading step is emitted via the output 4. This value is the correlation value for the real part.

The data path DEL may have precisely the same configuration as the first circuit section A1 for the data path SF. The output 5 of the data path DEL in this case corresponds to the output 10 of the first circuit section A1 of the data path SF. The output 6 is fed by the circuit, which is continued in FIG. 2 and comprises the adders AD and the registers R for adding up the results for the imaginary part.

Figure 3:
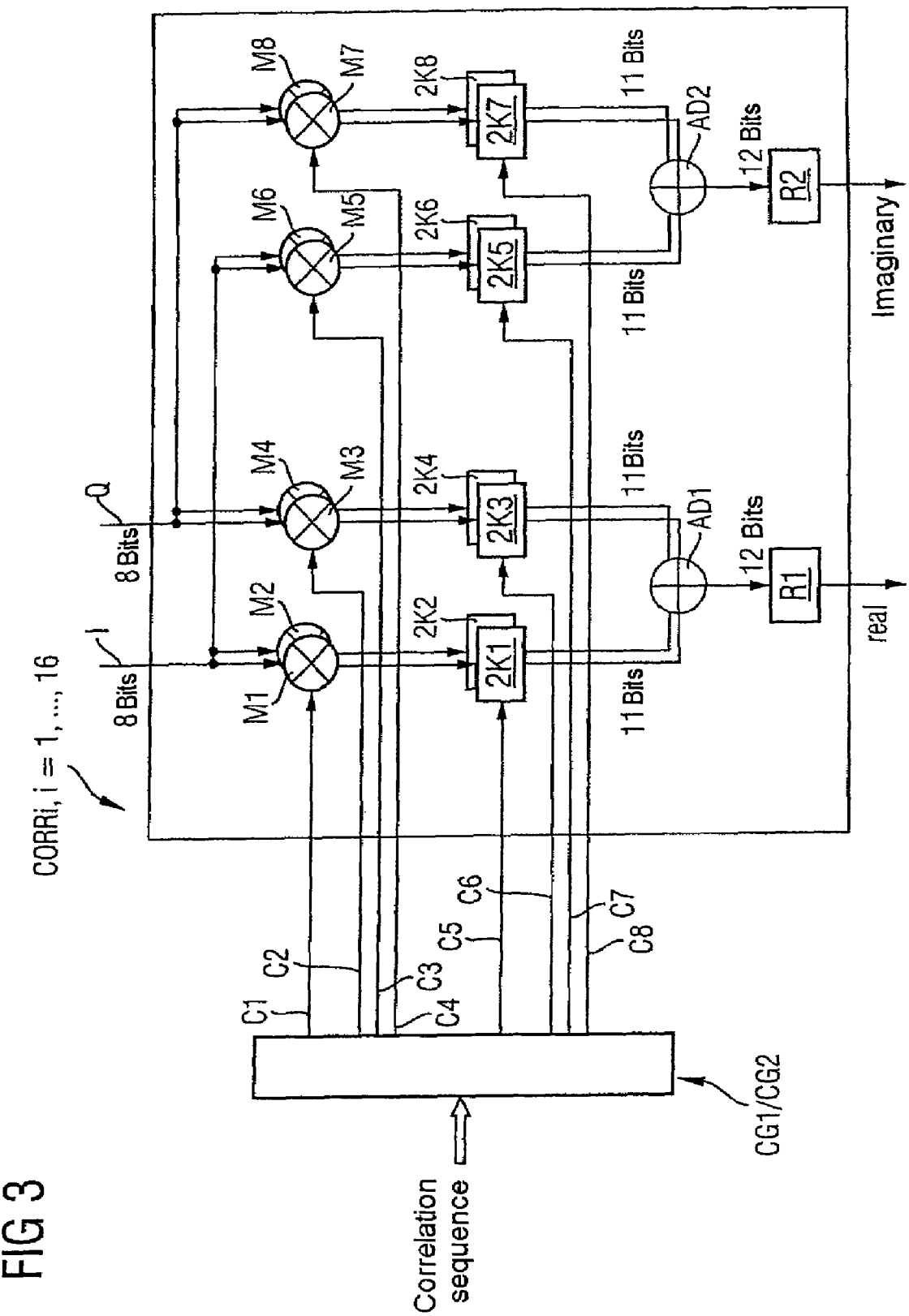
FIG. 3 shows the configuration of a correlator segment in FIG. 2.

FIG. 3 shows an exemplary embodiment of a correlator segment CORRi, i=1, ..., 16. The two inputs of the correlator segment are annotated I (for in-phase) and Q (for quadrature). The correlator segment CORRi is connected to the code generator CG1 or CG2, respectively, via 8 control lines C1, C2, ..., C8. It comprises four stages:

In a first stage, which comprises 8 multipliers M1, M2, ..., M8, the input I is multiplied by the signals on the control lines C1 and C3, and the input Q is multiplied by the control signals on the control lines C2 and C4. Two multipliers M1, M2; M3, M4; M5, M6 and M7, M8 are responsible for each complex multiplication.

The second stage comprises 8 two's-complement units 2K1, 2K2, ..., 2K8. The two's-complement unit 2Ki is connected on the input side to the multiplier Mi, i=1, 2, ..., 8. The two's-complement units 2K1 and 2K2 are driven via the control line C5, the two's-complement units 2K3, 2K4 are driven via the control line C6, the two's-complement units 2K5, 2K6 are driven via the control line C7, and the two's-complement units 2K7, 2K8 are driven via the control line C8.

The outputs of the two's-complement units 2K1 to 2K4 are added by an adder AD1, and the outputs of the two's-complement units 2K5 to 2K8 are added by an adder AD2 (third stage).

The fourth stage is formed by two registers R1 and R2, which are connected to the outputs of the respective adders AD1 and AD2. The register R1 emits the real part of the calculated result value, and the register R2 emits the imaginary part of the calculated result value. The organization of the data memory DS will be explained in the following text with reference to FIG. 4.

Each of the 16 memory elements SR1, SR2, ..., SR16 comprises 128 memory words, each having a word length of, for example, 16 bits. Each memory value represents a complex sample value (half chip) with a word length of 8 bits for the in-phase sample value and a word length of 8 bits for the quadrature sample value. The total capacity of the data memory DS is thus 16 (the number of memory elements)×128 (the number of memory values per memory element)=2048 half chips.

The input data memory DS is subdivided into two memory areas A and B of the same size. The memory area A is provided for the storage of 1024 even-numbered half-chips $1e, 2e, ..., 1024e$ and covers the addresses 1 to 64. 1024 odd-numbered half chips $1o, 2o, ..., 1024o$ are stored in the memory area B, which covers the addresses 65 to 128. As is illustrated in FIG. 4, the half chips which arrive in the sequence $1e, 1o, 2e, 2o, ..., 1024e, 1024o$ are stored in the sequence $1e, 2e, ..., 16e$ and $1o, 2o, ..., 16o$, respectively, in each case at the same memory addresses 1 and 65, respectively, in the memory elements SR1, SR2, SR16. The next 32 half chips $17e, 17o, 18e, 18o, ..., 32e, 32o$ are once again separated into even-numbered and odd-numbered half chips, in the sequence $17e, 18e, ..., 32e$ and $17o, 18o, ..., 32o$ respectively, at the respective memory addresses 2 and 66, in each case incremented by one, in the memory elements SR1, SR2, ..., SR16, etc.

Figure 7:
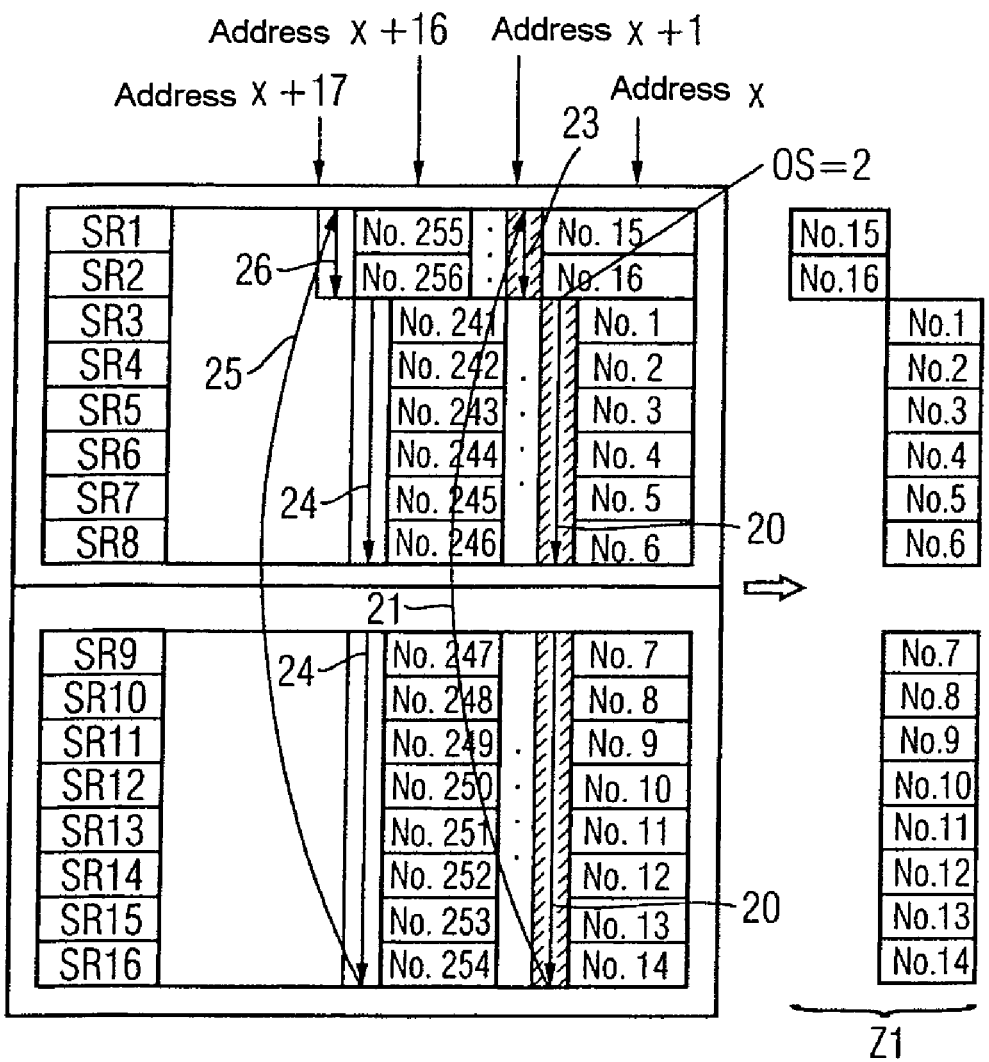
FIG. 7 shows an illustration in order to explain the reading rule for access to the sample values which are stored in the data memory.

FIG. 7 illustrates the process of reading sample values from the input data memory DS. Even-numbered and odd-numbered half chips (sample values) are in each case read in data reading sequences which comprise sixteen reading steps. Each reading step is carried out in one (machine) cycle. Sixteen sample values are read within each reading step.

A reading sequence is characterized by the jump address x and the offset OS. The first sample value No. 1 to be read is located at the address x in the register element SR(OS+1). In FIG. 7, OS=2. The rest of the process of reading sample values is carried out in the first reading step (cycle) along the arrows 20, 21 and 23. If OS≠0, the address is always incremented from x to x+1 within one reading step.

The next 15 reading steps in the data reading sequence are carried out analogously to the first reading step, with the address x being incremented in each cycle. The 16th and last reading step in the data reading sequence, in which the sample values (either even-numbered or odd-numbered half chips) Nos. 241 to 256 are read, starts at the address x+16, and continues along the arrows 24, 25 and 26. The final two sample values No. 255 and No. 256 are read at the address x+17 from the memory elements SR1 and SR2.

The reading rule, as illustrated in FIG. 7, for reading a sequence of 256 half chips applies both to the even-numbered half chips and to the odd-numbered half chips, with the jump address x in each case being chosen on the basis of the memory subdivision into the areas A and B. This means that the jump address x for reading the odd-numbered half chips is 64 greater than the jump address x for reading the even-numbered half chips. The right-hand part of FIG. 7 shows the first 16 read values (even-numbered or odd-numbered half chips), which are read in a first cycle Z1. The procedure for delay estimation in the data path DEL will be described in the following text with reference to the upper part of FIG. 5. The delay is estimated by means of a product correlation sequence comprising a scrambling code, a channelization code and pilot symbols, based either on the common pilot symbols in the UMTS channel CPICH or the dedicated pilot symbols in the UMTS channel DPCH (Dedicated Physical Channel).

In a first data reading sequence, 16×16 even-numbered half chips are read in the described manner from the input data memory DS in 16 reading steps during the cycles Z1 to Z16. These are the half chips $1e, 2e, ..., 256e$. In order to simplify the explanation here, it is assumed that the offset at the start of the reading process is OS=0.

The 16×16 odd-numbered half chips $1o, 2o, ..., 256o$ are read in 16 reading steps in the cycles Z17 to Z32 in the next, second data reading sequence. In this case as well, OS=0. The small offset which can be seen in FIG. 5 between the two data reading sequences indicates that the odd-numbered half chips $1o, 2o, ..., 256o$ are produced half the chip time period later than the even-numbered half chips $1e, 2e, ..., 256e$.

Owing to the parallelity of the data paths SF and DEL, respectively, one partial correlation value is emitted at the outputs 5 and 6 in each reading step. One correlation value is produced at the outputs 4 and downstream from the accumulators ACr and ACi, respectively, after each data reading sequence (16×16 sample values).

The reading process is repeated in the same way in the subsequent cycles Z33 to Z512, with the offset OS being incremented by one half chip (sample value) for each successive data reading sequence for the even-numbered and odd-numbered half chips. The offset is OS=16 half chips after 2×16=32 reading sequences.

Figure 5:
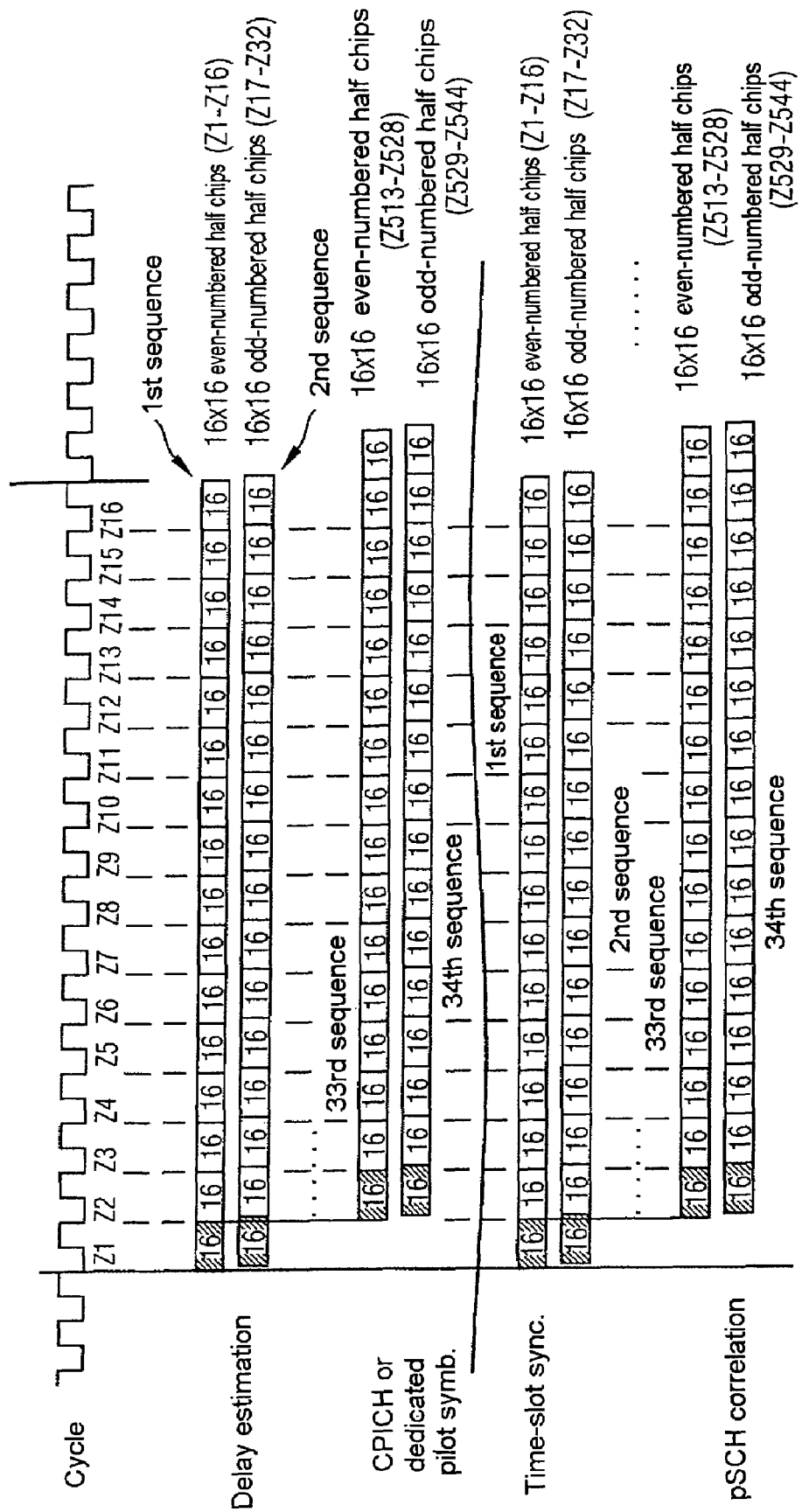
FIG. 5 shows an illustration in order to explain the reading rule and the method of operation of the two correlator data paths with respect to delay estimation.

FIG. 5 shows the 33rd data reading sequence (even-numbered half chips in the cycles Z513 to Z528) and the 34th data reading sequence (odd-numbered half chips in the cycles Z528 to 544). This reading procedure is continued until reading sequences for even-numbered and odd-numbered half chips are produced in all the possible time positions.

This means that the data reading sequences are carried out, by way of example (other initial values for x, OS are, of course, likewise possible) as follows:

$1^{st}$ Sequence: initial jump address x=1;
   Final jump address x=16; OS=0
$2^{nd}$ Sequence: initial jump address x=65;
   Final jump address x=80; OS=0
$3^{rd}$ Sequence: initial jump address x=1;
   Final jump address x=17; OS=1
$4^{th}$ Sequence: initial jump address x=65;
   Final jump address x=81; OS=1

.
.
.

$33^{rd}$ Sequence: initial jump address x=2;
   Final jump address x=17; OS=0
$34^{th}$ Sequence: initial jump address x=66;
   Final jump address x=81; OS=0
$35^{th}$ Sequence: initial jump address x=2;
   Final jump address x=18; OS=1
$36^{th}$ Sequence: initial jump address x=66;
   Final jump address x=82; OS=1

The processing of the 16 samples read in one reading step for delay estimation in the correlator segment CORRi, i=1, . . . , 16 will be explained in the following text.

In the case of delay estimation based on dedicated pilot symbols, the received symbol I+jQ is multiplied by the product of the dedicated complex pilot symbol (a+jb), the complex channelization code (c+jd) and the real scrambling code (e), (a,b,c,d,e=0.1, −1; where j denotes the imaginary unit):

$$(I+jQ)\cdot(a+jb)\cdot(c+jd)\cdot e = (I+jQ)\cdot(A+jB) = (A\cdot I - B\cdot Q) + j\cdot(B\cdot I + A\cdot Q);$$

where A=a·c·e−b·d·e, B=b·c·e+a·d·e.

The general form for the use of the control lines C1, C2, . . . , C8 is thus as follows:

C1: abs(A)
C2: abs(B)
C3: abs(B)
C4: abs(A)
C5: sign(A)
C6: sign(−B)
C7: sign(B)
C8: sign(A)

where abs(X) is the magnitude of X and sign(X)=0, when X is positive and sign(X)=1, when X is negative.

The lower part of FIG. 5 shows the method of operation of the data path SF, which does not differ from the processing in the data path DEL in the timing with respect to the processing of the written sample value when the pSCH sequence is used for the time-slot correlations. The difference is the way in which the correlator segments CORRi are driven, as will be explained in more detail in the following text.

The code sequence PSCH is produced in accordance with the 3G TS 25.213 Standard, V4.3.0, chapter 5.2.3, as follows:

For the definition of the sequence a based on: a=<x1, x2, . . . , x16>=<1,1,1,1,1,1, −1, −1, 1, −1, 1, −1, 1, −1, −1,1> the code sequence pSCH is formed by repetition of the sequence a, modulated with a complementary Golay sequence in accordance with the following expression:

pSCH=(1+j) x <a,a,a,−a,−a,a,−a,−a,a,a,a,−a,a,−a,a,a>, with the chip furthest to the left in the code sequence pSCH being the first transmitted chip in the code sequence.

One chip in the code sequence PSCH thus comprises (1+j) or (−1−j).

The arriving symbol is annotated I+jQ. The following expressions can thus be formed:

$$(I+jQ)\cdot(1+j)=(I-Q)+j(I+Q)$$

or $$(I+jQ)\cdot(-1-j)=(-I+Q)+j(-I-Q).$$

The following signals are therefore applied to the control lines C1, C2, . . . , C8 for the code generator CG2:

| Multiplication by | (1 + j) | (−1 − j) |
|---|---|---|
| C1: | 1 | 1 |
| C2: | 1 | 1 |
| C3: | 1 | 1 |
| C4: | 1 | 1 |
| C5: | 0 | 1 |
| C6: | 1 | 0 |
| C7: | 0 | 1 |
| C8: | 0 | 1 |

One alternative option for carrying out time-slot synchronization is for this to be done on the basis of the so-called hierarchical codes X2, X1. The hierarchical codes X2, X1 are defined in Annex A.1 of the abovementioned specification. Chapter 5.2.3 and Annex A1 of the UMTS specification 3G TS 25.213 V4.3.0 are included by reference in the contents of the present document.

Figure 6:
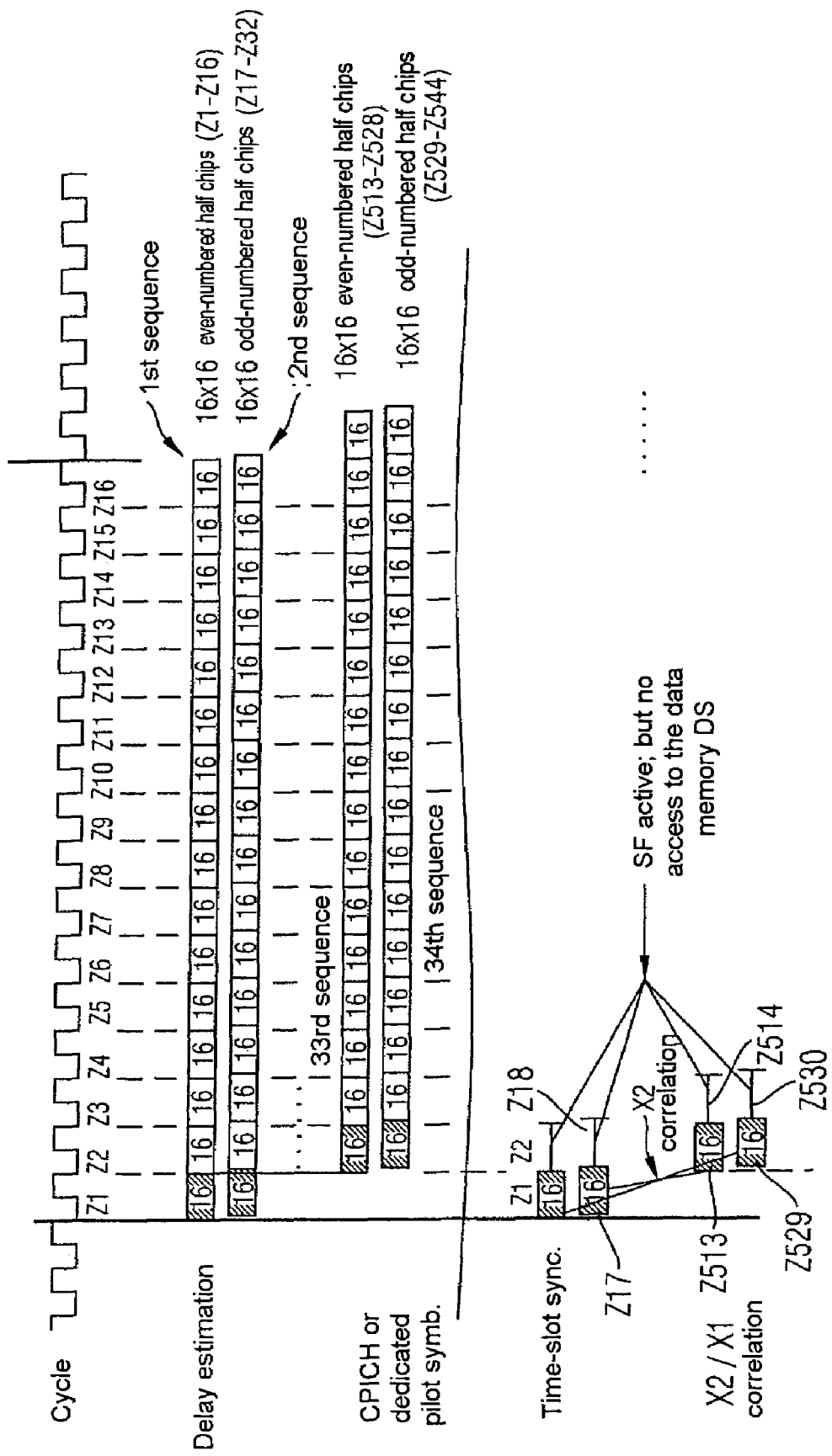
FIG. 6 shows an illustration in order to explain the reading rule and the method of operation of the two correlator data paths with respect to delay estimation and time-slot synchronization on the basis of hierarchical codes.

A flowchart for carrying out time-slot synchronization based on X2,X1 correlations is shown in the lower half of FIG. 6 (the upper half of FIG. 6 illustrates the delay estimation process carried out at the same time, and is identical to the upper half of FIG. 5). Only the first 16 half chips of the first data reading sequence (256 half chips) are required for time-slot synchronization. These 16 half chips are used for production of the X2 correlation value element. The X2 correlation value element is produced in the first cycle Z1, and is temporarily stored. The X1 correlation value element is calculated in the next cycle Z2 on the basis of 16 previously stored X2 correlation value elements. The data path SF is in this case active, but does not access the half chips read from the input data memory DS.

In the next fourteen cycles Z3 to Z16, neither is the data path SF still active nor are the (available) sample values accessed.

An X2 correlation value element is calculated once again in the cycle Z17 on the basis of the second data reading sequence shifted by one half chip. The X1 correlation value is calculated in the cycle Z18 on the basis of the 16 previously calculated X2 correlation value elements, without accessing the sample values that have been read for this purpose. This is then followed once again by fourteen cycles without any activity on the data path SF. This procedure is continued, as shown in the illustration in FIG. 6, in the 33rd and 34th data reading sequence with data accesses in the respective cycles Z513 and Z529 and respective calculation cycles Z514 and Z530 for X1 correlation value.

The delay estimation (on the basis of the channel CPICH or of the dedicated pilot symbols) and the time-slot synchronization (on the basis of the code sequence pSCH or of the hierarchical codes X2,X1) can be carried out completely independently of one another at any given times without the reading rule for reading the sample values from the input data memory DS being influenced for this purpose.

For example, a half chip offset OS is predetermined for the start of the delay estimation by a processor (which is not illustrated). At the start of the next data reading sequence, the data path DEL starts with the selected offset OS, see FIG. 7. The subsequent reading sequences are read alternately in the already described manner for the even-numbered and odd-numbered half chips, in each case with a half chip time offset. The time-slot synchronization is intended to be carried out at an undefined, later time. The data path SF is activated at an initial time for a data reading sequence for any given offset OS—for example the next data reading sequence. Depending on the desired operating mode (time-slot synchronization based on PSCH or X2/X1 correlation), either all of the data reading sequences or only the first 16 half chips of the first reading step are processed by the data path SF. The address generator A_GEN is thus continuously active, at least when a first correlation procedure is being carried out, and correlation procedures to be added are easily synchronized to the stream of sample values which have been read. One particular advantage of the described exemplary embodiment, in which the number of memory elements SR1, SR2, ..., SR16 is identical to the number of inputs of the data paths SF and DEL, is that the control lines C1, C2, ..., C8 can have control signals which are constant over time applied to them throughout a correlation procedure. However, it is also possible to reduce the number of memory elements which can be driven separately from 8 to 4 memory elements. In this case, the drive by the code generators CG1 and CG2 must be modified, since it is necessary to take account of the fact that it is no longer possible to shift the reading sequence (offset) accurately by one half chip.

For example, when a total M=4 memory elements SR1-4 are present, 4 half chips are read from one address from each memory element. In the first reading sequence (256 half chips) Z1, these sample values are processed in precisely the same way as that already described for 16 memory elements.

For the next correlation of the 256 sample values with the correlation sequence (which corresponds to Z3), the offset by one half chip must be achieved by appropriately shifting the correlation sequence, since this offset cannot be produced owing to the increased memory granularity in the reading step. Since an offset by 2 or by 3 half chips cannot be produced in the reading process either, the respective code generators CG1 and CG2 must be able to offset the correlation sequence between 0 and 3 half chips in the form of a continuous repetition. The simplification of the input data memory DS is thus at the expense of increased complexity of the code generators CG1 and CG2. When there are a total of M=8 memory elements SR1-8, two half chips are read from one address 5 from each memory element. During the first reading sequence, for example for even numbered half chips (256 half chips, corresponding to Z1), these sample values are processed in precisely the same way as that already described for 16 memory elements. The code generators are also operated as already described for the reading sequences, which are annotated in the cycles Z5, Z9, .... The offset by one half chip must be produced in every alternate cycle Z3, Z7, ... by means of appropriately shifting the correlation sequence, that is to say by means of the code generators CG1, CG2 since the minimum offset which can be produced when reading from the data memory is two half chips (sample values).

Finally, it is noted that the reading procedure and the supplying of sample values to the data paths DEL and SF can be carried out without any time restrictions by using a system frequency of 124.8 MHz.

The most critical situation from the timing point of view is time-slot correlation on the basis of the channel pSCH. 2×2560 correlation processing operations must be carried out within one time slot, with one correlation processing operation lasting for one data reading sequence (256 half chips). Since 16 half chips are correlated during one machine cycle Z1, Z2, ..., one correlation processing operation lasts for 16 cycles. In consequence, 2×2560×16=81920 machine cycles are required for time-slot synchronization.

Furthermore, it should be remembered that two machine cycles are required in order to load 16 even-numbered half chips and 16 odd-numbered half chips into the input data memory DS within a time interval of 16 chips. Overall, a time interval of 512 machine cycles is required for writing the sample values for one time slot to the input data memory DS. The total number of machine cycles required is thus 81920+512=82432 machine cycles. At a frequency of 124.8 MHz, this time period is 660.5 µs, and is thus shorter than the duration of one time slot (666 µs) based on the UMTS Standard.

Although the invention has been shown and described with respect to a certain aspect or various aspects, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several aspects of the invention, such feature may be combined with one or more other features of the other aspects as may be desired and advantageous for any given or particular application. Furthermore, to the extent that the term "includes" is used in either the detailed description or the claims, such term is intended to be inclusive in a manner similar to the term "comprising."

What is claimed is:

1. A method for performing correlation in a mobile radio system comprising:
    storing sample values to a data memory;
    reading the sample values from the data memory according to a predetermined reading rule, wherein reading the sample values comprises reading a fixed number of sample values in a single reading step from a plurality of separately addressable memory elements within the data memory;
    selecting a first correlation sequence according to the read sample values;

performing a first correlation procedure on the read sample values according to the first correlation sequence;

selecting a second correlation sequence according to the read sample values;

performing a second correlation procedure on the read sample values according to the second correlation sequence; and wherein the first correlation procedure is associated with a first type synchronization and the second correlation procedure is associated with a second type synchronization varied from the first type synchronization.

2. The method of claim 1, wherein the first type synchronization is time slot synchronization and the second type synchronization is frame synchronization.

3. The method of claim 1, wherein the second type synchronization is time slot synchronization and the first type is frame synchronization.

4. The method of claim 1, wherein the first type synchronization is associated with a mobile receiver.

5. The method of claim 1, wherein the number of sample values is equal to the number of the memory elements within the data memory.

6. The method of claim 1, wherein the number of memory elements is greater than the number of sample values read in the single step.

7. The method of claim 1, further comprising repeating the method a number of times.

8. The method of claim 1, wherein the first correlation procedure is performed by a first hardware correlator.

9. The method of claim 1, wherein the second correlation procedure is performed concurrently with the first correlation procedure.

10. The method of claim 1, wherein the first correlation procedure is performed by a first hardware correlator and the second correlation procedure is performed by a second hardware correlator in parallel.

11. The method of claim 1, wherein the first correlation procedure and the second correlation procedure are performed by a hardware correlator using time-division multiplexing.

12. The method of claim 1, wherein the second correlation procedure generates an estimate of delay times on propagation paths for a received signal that comprised the sample values.

13. A circuit arrangement that performs correlation procedures in a mobile radio system, the arrangement comprising:

a data memory that stores sample values from a received signal, wherein the data memory comprises a plurality of addressable memory elements;

an address generator that produces addresses for reading sample values from the data memory according to a predetermined reading rule, wherein the address generator produces a plurality of addresses in a single step; and at least one hardware correlator that employs the produced addresses and performs a first correlation procedure using a first correlation sequence and a second correlation procedure using a second correlation sequence, wherein the second correlation sequence is varied from the first correlation sequence.

14. The circuit arrangement of claim 13, wherein the first correlation sequence is associated with a first task in a mobile radio receiver.

15. The circuit arrangement of claim 14, wherein the second correlation sequence is associated with a second task.

16. The circuit arrangement of claim 15, wherein the first task is frame synchronization and the second task is time slot synchronization.

17. The circuit arrangement of claim 13, wherein the number of the addresses produced is less than the number of the plurality of addressable memory elements.

18. The circuit arrangement of claim 13, wherein the at least one hardware correlator comprises a single hardware correlator.

19. The circuit arrangement of claim 18, further comprising a multiplexer arranged upstream of the single hardware correlator.

20. The circuit arrangement of claim 13, wherein the at least one hardware correlator comprises a first hardware correlator that performs the first correlation procedure and a second hardware correlator that performs the second correlation procedure.

21. The circuit arrangement of claim 20, wherein the first hardware correlator comprises a plurality of correlation segments parallel.

* * * * *

UNITED STATES PATENT AND TRADEMARK OFFICE
CERTIFICATE OF CORRECTION

PATENT NO. : 7,522,655 B2  Page 1 of 1
APPLICATION NO. : 11/075848
DATED : April 21, 2009
INVENTOR(S) : Thomas Ruprich et al.

It is certified that error appears in the above-identified patent and that said Letters Patent is hereby corrected as shown below:

Claim 21, Column 14, line 43; please replace "segments parallel" with --segments arranged in parallel--

Signed and Sealed this

Second Day of June, 2009

JOHN DOLL
*Acting Director of the United States Patent and Trademark Office*